United States Patent
Mantey et al.

[11] Patent Number: 5,926,339
[45] Date of Patent: Jul. 20, 1999

[54] METHOD FOR SERVO TRACK IDENTIFICATION

[75] Inventors: John Paul Mantey; Steven Gregory Trabert, both of Boulder; Ronald Dean Gillingham, Longmont; Richard Lewis O'Day, Boulder, all of Colo.

[73] Assignee: Storage Technology Corporation, Louisville, Colo.

[21] Appl. No.: 08/804,457

[22] Filed: Feb. 21, 1997

[51] Int. Cl.⁶ ................................................. G11B 5/584
[52] U.S. Cl. ..................................... 360/78.02; 360/77.12
[58] Field of Search ........................... 360/77.12, 78.02, 360/75

[56] References Cited

U.S. PATENT DOCUMENTS

| | | | |
|---|---|---|---|
| 4,462,053 | 7/1984 | Lum et al. | 360/78 |
| 4,472,750 | 9/1984 | Klumpp et al. | 360/78 |
| 4,498,129 | 2/1985 | Velazquez | 364/174 |
| 4,586,094 | 4/1986 | Chambors et al. | 360/77 |
| 4,646,175 | 2/1987 | Sokolik et al. | 360/78 |
| 4,996,609 | 2/1991 | Joannou | 360/57 |
| 5,121,270 | 6/1992 | Alcudia et al. | 360/77.12 X |
| 5,229,895 | 7/1993 | Schwarz et al. | 360/77.12 |
| 5,384,669 | 1/1995 | Dunn et al. | 360/48 |
| 5,386,324 | 1/1995 | Fry et al. | 360/53 |
| 5,394,277 | 2/1995 | Pahr et al. | 360/77.12 X |
| 5,394,280 | 2/1995 | Chliwyj et al. | 360/77.12 |
| 5,396,376 | 3/1995 | Chambors et al. | 360/48 |
| 5,408,366 | 4/1995 | Bentley et al. | 360/53 |
| 5,448,430 | 9/1995 | Bailey et al. | 360/77.12 |
| 5,453,887 | 9/1995 | Negishi et al. | 360/77.12 X |
| 5,629,813 | 5/1997 | Baca et al. | 360/77.12 |

OTHER PUBLICATIONS

Timing based track following servo for Magnetic Tape; Barrett, Albrecht, Eaton; IEEE; Jul., 1996.
Design of a Disk File Head Positioning Servo; R K Oswald; IBM J. Res. Develop.; Nov. 1974.

*Primary Examiner*—Aristotelis M. Psitos
*Assistant Examiner*—K. Wong
*Attorney, Agent, or Firm*—Brooks & Kushman P.C.

[57] ABSTRACT

A method for identifyng a servo track. Information from the servo track about the odd or even number of the track is combined with information about the presence or absence of a track identification area to identify the track number.

9 Claims, 3 Drawing Sheets

DIRECTION OF TAPE MOVEMENT

5,926,339

METHOD FOR SERVO TRACK IDENTIFICATION

BACKGROUND OF THE INVENTION

1. Field of the Invention

The invention relates to the field of dynamic magnetic information storage or retrieval. More particularly, the invention relates to the field of automatic control of a recorder mechanism. In still greater particularity, the invention relates to track identification. By way of further characterization, but not by way of limitation thereto, the invention is a method for servo track identification which uses a track identification field in the servo pattern.

2. Description of the Related Art

Magnetic tape recording has been utilized for many years to record voice and data information. For information storage and retrieval, magnetic tape has proven especially reliable, cost efficient and easy to use. In an effort to make magnetic tape even more useful and cost effective, there have been attempts to store more information per given width and length of tape. This has generally been accomplished by including more data tracks on a given width of tape. While allowing more data to be stored, this increase in the number of data tracks results in those tracks being more densely packed onto the tape. As the data tracks are more closely spaced, precise positioning of the tape with respect to the tape head becomes more critical as errors may be more easily introduced into the reading or writing of data. The tape—tape head positioning may be affected by variations in the tape or tape head, tape movement caused by air flow, temperature, humidity, tape shrinkage, and other factors, especially at the outside edges of the tape.

In order to increase data track accuracy, servo tracks have been employed to provide a reference point to maintain correct positioning of the tape with respect to the tape head. One or more servo tracks may be used depending upon the number of data tracks which are placed upon the tape. The sensed signal from the servo track is fed to a control system which moves the head and keeps the servo signal at nominal magnitude. The nominal signal occurs when the servo read gap is located in a certain position relative to the servo track.

Referring to FIG. 1, a one-half inch wide length of magnetic tape 11 may contain up to 288 or more data tracks on multiple data stripes 12. A thin film magnetic read head is shown in upper position 13 and lower position 14 to read data from data tracks 12. If a tape read head has sixteen elements and, with movement of the head to multiple positions, each element can read nine tracks, then that magnetic read head could read 144 tracks. In order to read more tracks, such as 288 in the desired configuration, two data bands 15 and 16 are utilized. The tape head is movable to nine tracking positions in each of upper position 13 and lower position 14. That is, with the tape head in position 13 it can read 144 tracks in data band 15 and in position 14 it can read 144 tracks in data band 16. With dual data bands 15 and 16 and multiple head positions within those bands, tape head positioning is critical.

In order to achieve accurate multiple head positions it may be desirable to include up to five or more servo stripes 17. Servo stripes 17 may utilize various patterns or frequency regions to allow precise tape to tape head positioning in multiple positions. This allows a data read head to more accurately read data from data stripes 12. Referring to FIG. 2, servo stripes 17 are shown in greater detail. As is disclosed in copending patent application entitled TAPE SERVO PATTERN WITH ENHANCED SYNCHRONIZATION PROPERTIES (attorney docket no. 96-010-TAP) filed on the same date as this application and hereby incorporated by reference, a first frequency signal 19 is written across the width of a frame 18 in each servo stripe 17. As is known in the art, a measurably different frequency such as an erase frequency is written over first frequency signal 19 in a predetermined pattern such as the checkerboard patterns in regions 21 and 22. The horizontal sides of twelve rectangles (20 and 23) in each stripe 17 are substantially parallel to the direction of movement of tape length 11. The six rectangles (12 sides) in each region 21 and 22 define five horizontal interfaces (servo tracks) 24 between frequency signal 19 and rectangles 20, 23 as the outside interfaces 25 along the top and bottom of each stripe 17 are ignored. In the preferred embodiment, rectangles 20 are shown on the left side of areas 21 and 22 and rectangles 23 are shown on the right side of areas 21 and 22. A servo read element 26 in a tape read head is precisely aligned along interface 24 to read the signal frequency along interfaces 24. That is, dotted line representing interface 24 along the horizontal sides of rectangles 20, 23 passes through the center of servo read element 26. If the servo pattern on the tape moves right to left, then servo read element 26 will alternate between reading frequency 19 across the full width of servo read element 26 between areas 21 and 22 and reading frequency 19 across one half of servo read element 26 and an erase frequency from rectangles 20, 23 across the other half of the width of servo read element 26. Thus, if tape 11 moves as shown in FIG. 2, servo read element 26 will first sense rectangle 20 above track 24 and then sense rectangle 23 below track 24 in each of regions 21 and 22.

As is known in the art, the servo control system in a tape drive determines the position error signal by using the ratio of the difference between the signal amplitude sensed during the first (left) half of patterns 21 or 22 and the signal amplitude sensed during the second (right) half of patterns 21 or 22 divided by the sum of the signal amplitude sensed during the first half of patterns 21 or 22 and the signal amplitude sensed during the second half of patterns 21 or 22 to stay on track. For a head position precisely on track in checkerboard pattern areas 21 or 22 shown in FIG. 2 the ratio will be zero because the signal during each half of the pattern will be the same. If servo read element 26 is above track 24, the polarity of the position error signal will be positive because more of rectangle 20 above track 24 and less of rectangle 23 below track 24 will be read. In response, the track servo will move the head (including servo read element 26) down until the ratio is zero and servo read element 26 is precisely on track 24. Conversely, if servo read element 26 is below track 24, the polarity of the position error signal will be negative because more of rectangle 23 below track 24 and less of rectangle 20 above track 24 will be read. In response, the track servo will move the head (including servo read element 26) up until the ratio is zero and servo read element 26 is precisely on track 24. In this way the tape controller can sense the position of the tape 11 with respect to the servo read element 26 and move the tape head to keep the head servo read element 26 aligned with the servo track along line 24. This alignment ensures precise reading of a data track in data stripes 12 by the data read head (not shown).

While the above described system is used to keep servo read element 26 (and in turn the read head) precisely on a track, the tape controller system does not know whether servo read element 26 is on the right track. As is known in the art, an optical sensor may be used to approximately position the tape head with respect to the tape. However, when precise positioning is required to position a read gap over a data track in data stripe 12, an optical sensor is not accurate enough. That is, with the expected range of tape motion due to guiding being significantly wider than track pitch, it is not possible to insure that track following will start on the desired track. This could result in the wrong track being read. It would be desirable to have a system in which the servo control circuitry could reliably determine upon which track 24 servo read element 26 is located.

A prior art solution to tape positioning is to have sufficient information recorded in the data tracks to permit proper identification of the track prior to starting a read or write operation. This approach requires the tape cartridge to be prerecorded at the factory to insure that all tracks had proper identification before being used in the field. Prewriting all tracks with sufficient information to properly identify each track adds to the cost of each cartridge. In addition, using data track space for identification information affects capacity because the amount of available space on a data track for actual storage of data is reduced.

SUMMARY OF THE INVENTION

The invention is a novel method for track identification which uses a track identification area in combination with information about the even or odd track location. The track identification area is positioned over one or more servo tracks depending upon the servo stripe location. The tape controller is able to discern whether the sensed track is an odd or even numbered track by the polarity of the position error signal used in the tracking servo. The tape controller then identifies the sensed track by combining the presence or absence of a track identification area on a track with the odd or even track determination.

DESCRIPTION OF THE PREFERRED EMBODIMENT

Figure 1:
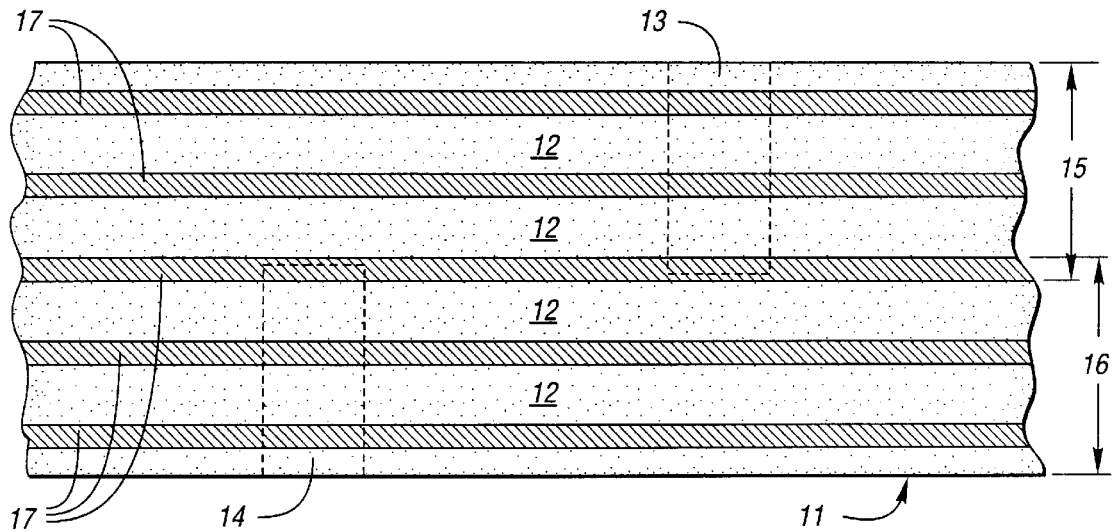
FIG. 1 is an illustration of multiple data and servo stripes in data bands on magnetic tape.
Figure 2:
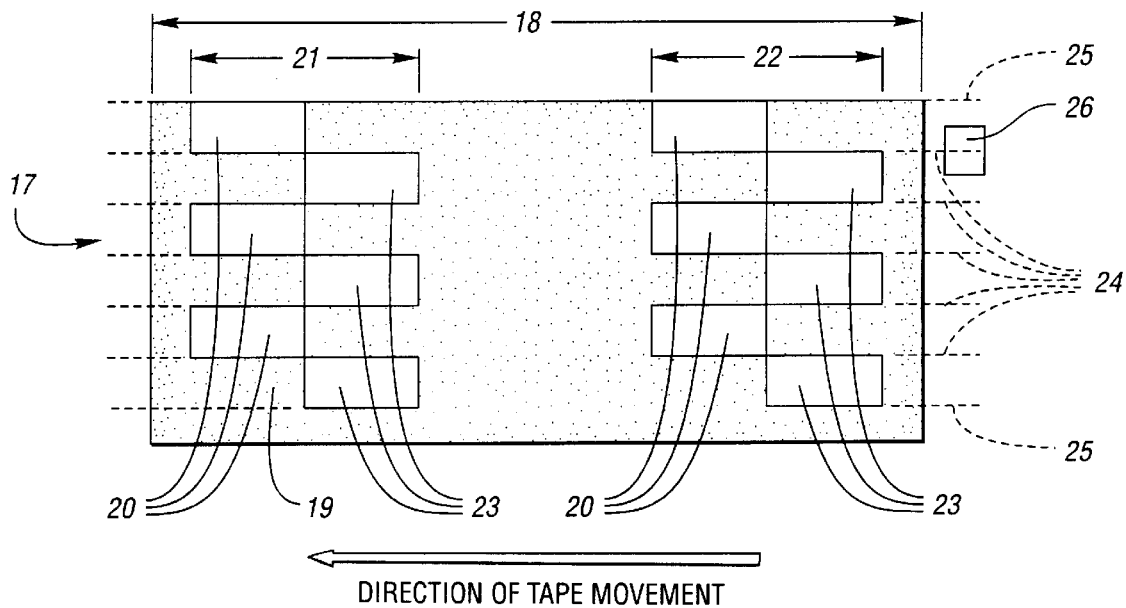
FIG. 2 is an illustration of a servo frame illustrating a servo pattern.

Referring to the drawings wherein like reference numerals denote like structure throughout each of the various figures, FIG. 1 illustrates multiple servo stripes 17 written onto tape 11 to precisely align tape head read gaps over data tracks in data stripes 12. Referring to FIG. 2, servo read element 26 is precisely aligned on track 24 as shown. That is, dotted line representing track 24 passes along the edges of rectangles 23 and through the center of servo read element 26. The tape controller thus knows that head servo read element 26 is centered on a track. The tape controller also knows whether the track is odd or even numbered by the polarity of the position error signal used in the track following servo. What the tape controller does not know is on which odd or even track the tape head is centered. The present invention provides sufficient information to the tape controller to allow it to determine on which track servo read element 26 is centered.

Figure 3:
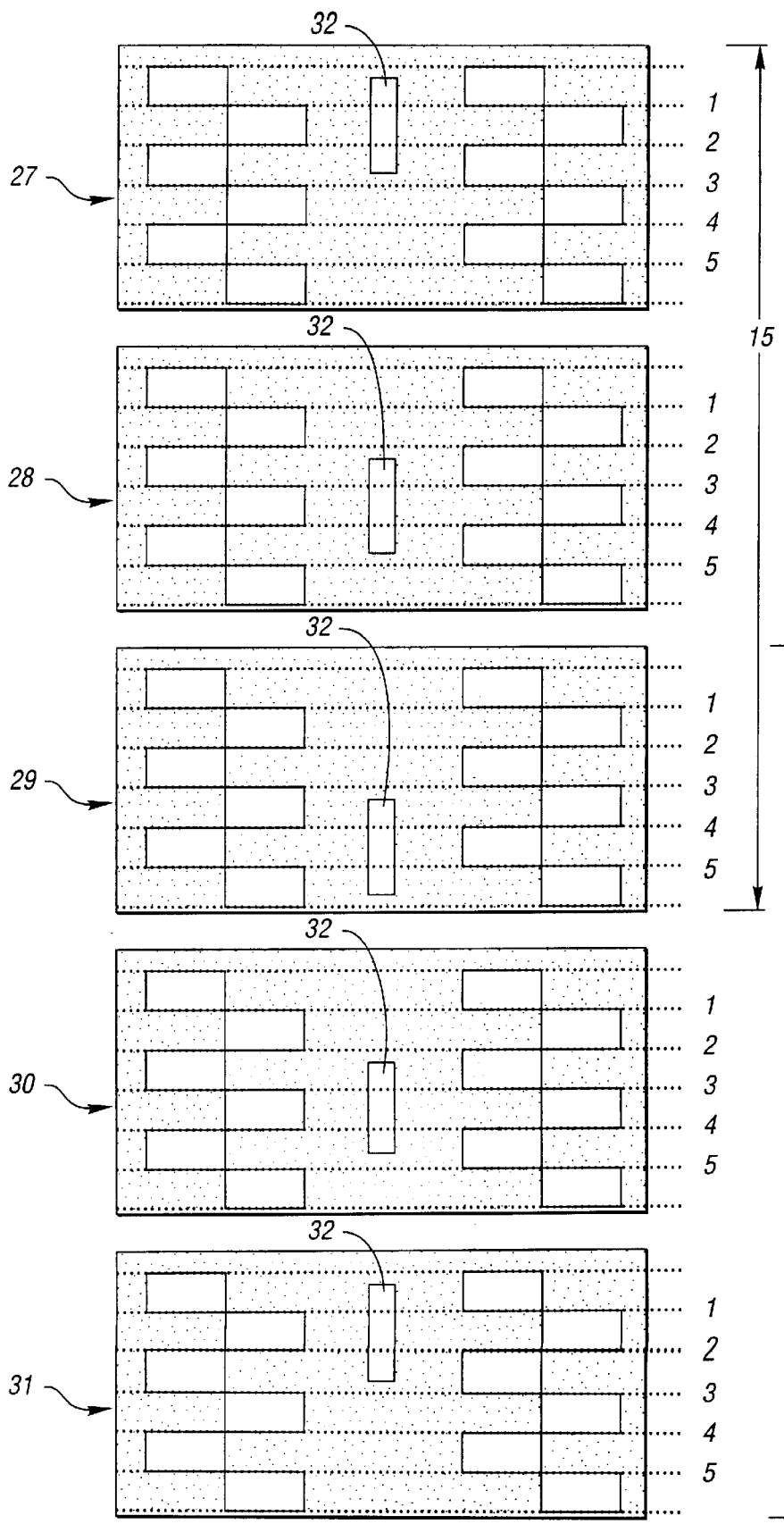
FIG. 3 is an illustration of a multiple servo stripes with a servo pattern including a track identification area in accordance with the invention.

Referring to FIGS. 1 and 3, one frame 18 in each of five servo stripes 17 are shown. In FIG. 3, five servo stripes numbered 27, 28, 29, 30, and 31 are shown enlarged and closely spaced for description purposes. As can be appreciated by one skilled in the art, these servo stripes are actually narrow and distributed across the active area of the tape. Frame 18 in each servo stripe 27–31 is identical as described with respect to FIG. 2 above except that a track identification area 32 is added to each frame 18 in a unique location. Each stripe has five servo tracks 24 numbered 1 through 5. The servo system knows by the polarity of the position error signal used in the track following servo whether it is following an even numbered track (2 or 4) or an odd numbered track (1, 3, or 5) but it does not know which odd or even numbered track is being followed For example, if an odd numbered track (i.e. 1) is being followed, then in each of areas 21 and 22, the system will expect the presence of rectangle 20 above track 1 prior to sensing rectangle 23 below track 1. This will be true of all odd numbered tracks. This expectation will cause the odd numbered tracks to be stable equilibrium areas and the even numbered tracks to be unstable equilibrium areas, If the polarity of the position error signal is set for odd numbered tracks and servo read element 26 is located on an even numbered track then the track following servo will move the head to one of the two neighboring odd numbered tracks. If an even numbered track is desired, then rectangle 20 will be expected below the track prior to sensing the rectangle 23 above the track and the polarity of the position error signal sensed by the track following servo will thus be reversed from what it was for the odd numbered tracks. Of course, it will be appreciated by one skilled in the art that the selection of positive and negative polarities for positions above or below the track is one of design choice and could easily be reversed.

As stated above, tape 11 may be divided into an upper band 15 and a lower band 16. That is, the active portion of the read/write head covers approximately half of the width of the tape at any time (i.e. positions 13 and 14 in FIG. 1). For upper band 15, servo stripes 27, 28 and 29 are used for track following by the servo system. Similarly, stripes 29, 30, and 31 are used for lower band 16. When the servo system is in the track following mode, it will be attempting to keep the centerline of the three servo read gaps 26 over the desired track centerline in each of three stripes (27,28, 29 or 29,30,31). For example, when the system is following track 2 in the upper band 15, the servo system will have a servo read element 26 centered on track 2 in each of stripes 27, 28 and 29.

In order to identify the track being followed a track identification area 32 is added to each frame 18. In the preferred embodiment, track identification area 32 is written in a rectangular configuration over two of the five servo tracks 24 in each servo stripe 17. The location on the frame varies among the servo stripes 17. The location of track identification area 32 is the same in stripes 27 and 31 (over tracks 1 and 2) and the location is the same in stripes 28 and 30 (over tracks 3 and 4). In stripe 29 track ID 32 is over tracks 4 and 5. Stripe 29 is common to both bands 15 and 16. Any two of the three stripes (27, 28, 29) or (29, 30, 31) are sufficient to identify the track 24 being followed. This permits one stripe to be ignored when tape defects or other problems are encountered. Track ID 32 is detected when the servo system is in the track following mode and servo read element 26 is passing the longitudinal portion of the servo frame 18 where track ID 32 is recorded. In the preferred embodiment, the erased area comprising track ID 32 is detected when the signal level in the area is less than a predetermined threshold value. For example, this threshold value could be 10% of the nominal level of signal 19. The locations of the lateral edges of the erased area 32 with respect to the track centerlines 24 are a function of the threshold level, the residual signal (how much is left after erase) in the erased area 32, and the desire to minimize detection error.

Referring to FIG. 3, track ID 32 in stripe 27 is detected when the system is following track 1 or 2. As described above, from the polarity of the position error signal, the servo knows if the track 24 is an odd or even track. Thus, using only stripe 27, the system is capable of uniquely identifying tracks 1, 2, and 4 but it could not distinguish between tracks 3 and 5. Track 1 is distinguished because the track ID 32 is detected and the system knows it is following an odd track 24. Similarly, track 2 is identifiable because of the presence of track ID 32 and because it is an even track. Track 4 is detected because track ID is not present and it is an even track. Tracks 3 and 5 are indistinguishable from each other because they are both odd and neither has a track ID 32. The same analysis holds for stripe 31 which has an identical configuration as stripe 27. Stripes 28 and 30 also have identical configurations and, applying the same analysis as above, tracks 2, 3, and 4 can be identified in stripes 28 and 30 but the system cannot distinguish between tracks 1 and 5. Applying the analysis to stripe 29 in FIG. 3, tracks 2, 4 and 5 can be identified but tracks 1 and 3 in stripe 29 are indistinguishable.

With tape 11 divided into two bands 15 and 16, either stripes 27, 28 and 29 or stripes 29, 30 and 31 are available at any one time. As stated above, any combination of two of the three available stripes from a set of three is sufficient for the system to uniquely identify the track being followed by the servo system. The third stripe in each set is used for redundancy purposes in the event of a scratch or other defect on the tape.

Figure 4:
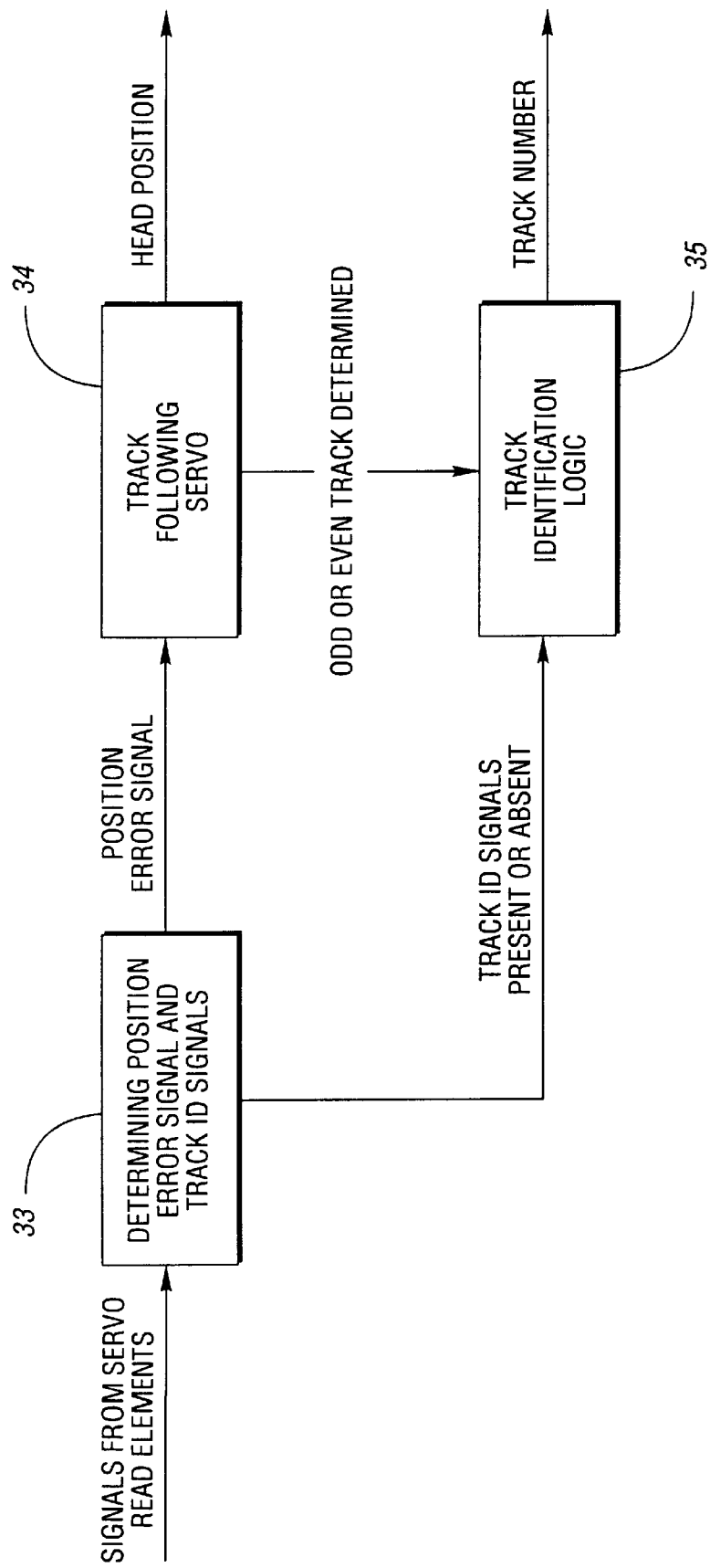
FIG. 4 is a block diagram illustrating the track identification method used by the tape controller.

Referring to FIG. 4, the identification of a track 24 in FIG. 3 is as follows. Assume the system is operating in band 15 (stripes 27, 28, and 29) but that stripe 29 is unavailable as it is not needed. With servo read element 26 centered on track 5 in stripes 27 and 28, the tape controller logic 33 receives the signals from element 26 and determines the position error signal and the presence (or absence) of track identification area 32. The polarity of the position error signal is used by the servo system 34 to position the read head and to eliminate tracks 2 and 4 as they are even numbered tracks. Thus, from servo logic 34, the tape controller knows that one of tracks 1, 3, or 5 is being followed. However, because tape controller logic 33 did not determine the presence of track ID 32 from the signal on the track being followed in stripe 27, track 1 is eliminated as a candidate by tape controller logic 35. Similarly, because no track ID 32 was detected on the track being followed in stripe 28, track 3 is eliminated by tape controller logic 35. Track 5 is the only common candidate from stripes 27 and 28 and it is identified by tape controller logic 35 as the track being followed.

While the invention has been described with respect to a particular embodiment thereof, it is not to be so limited as changes and modifications may be made which are within the full intended scope of the invention as defined by the appended claims. For example, while specific numbers of servo tracks and data tracks have been disclosed, the invention may be utilized with more or less servo or data tracks without departing from the scope of the invention. The rectangular configuration of track identification area 32 may also be modified and could intersect one or more servo tracks depending upon the number of servo trades in a servo stripe. Similarly, while a particular checkerboard tape servo pattern has been disclosed, different types of patterns may be employed without departing from the scope of the invention.

What is claimed is:

1. A method for identifying a servo track on a length of magnetic tape comprising a plurality of data tracks separated by a plurality of servo stripes, each servo stripe including at least three servo tracks, the method comprising:

sensing a servo track simultaneously in each of at least two servo stripes;

determining if at leased one sensed servo track is an even numbered track or an odd numbered track;

detecting the presence or absence of a track identification area intersecting the sensed servo track at a specified location in each of the at least two servo stripes; and identifying the servo track number based on the determined even or odd track number and based on the detected presence or absence of the track identification area in each of the at least two servo stripes.

2. A method according to claim 1 wherein the track identification area intersects different servo tracks on each of the at least two servo stripes.

3. A method according to claim 1 wherein the track identification area intersects at least two servo tracks in each of the at least two servo stripes.

4. A method according to claim 1 wherein the at least two servo stripes is three servo stripes and wherein the servo track number can be identified from detecting the presence or absence of the track identification area on any two servo stripes, the method further comprising detecting the presence or absence of the track identification area on the servo tracks from three servo stripes to permit redundancy.

5. A method according to claim 1 wherein each servo stripe is divided into frames, the method further comprising detecting the presence or absence of the track identification area in a plurality of frames.

6. A method according to claim 5 wherein each servo track is defined by an interface substantially parallel to a direction of movement of the length of magnetic tape, the interface defined by a first frequency signal written onto a first portion of each frame and a second frequency signal written in a predetermined pattern onto a second portion of each frame, the second frequency signal being measurable different than the first frequency signal.

7. A method according to claim 6 wherein the predetermined pattern includes a plurality of rectangles in a checkerboard pattern, the rectangles including two sides substantially parallel to the direction of movement of the magnetic tape, the sides defining the servo track.

8. A method according to claim 1 wherein determining if at leased one sensed servo track is an even numbered track or an odd numbered track includes calculating polarity of a position error signal associated with the at least one sensed servo track.

9. A method according to claim 8 wherein identifying the servo track number comprises:

analyzing the polarity of the position error signal;

eliminating possible servo track numbers based on the analyzed position error signal polarity; and eliminating possible servo track numbers based on detecting the presence or absence of a track identification area.

\* \* \* \* \*